United States Patent
Feng et al.

(10) Patent No.: US 9,166,588 B2
(45) Date of Patent: Oct. 20, 2015

(54) SEMICONDUCTOR DEVICE INCLUDING ENHANCED VARIABILITY

(71) Applicant: International Business Machines Corporation, Armonk, NY (US)

(72) Inventors: Kai D. Feng, Hopewell Junction, NY (US); Wai-Kin Li, Beacon, NY (US); Ping-Chuan Wang, Hopewell Junction, NY (US); Zhijian J. Yang, Stormville, NY (US)

(73) Assignee: GLOBALFOUNDIRES INC., Grand Cayman (KY)

( * ) Notice: Subject to any disclaimer, the term of this patent is extended or adjusted under 35 U.S.C. 154(b) by 122 days.

(21) Appl. No.: 14/158,917

(22) Filed: Jan. 20, 2014

(65) Prior Publication Data
US 2015/0207505 A1 Jul. 23, 2015

(51) Int. Cl.
| H01L 29/76 | (2006.01) |
| H03K 19/003 | (2006.01) |
| H01L 21/31 | (2006.01) |
| H01L 27/088 | (2006.01) |
| H01L 27/02 | (2006.01) |
| H01L 21/8234 | (2006.01) |
| H01L 21/266 | (2006.01) |
| H01L 23/58 | (2006.01) |

(52) U.S. Cl.
CPC ........ *H03K 19/00315* (2013.01); *H01L 21/266* (2013.01); *H01L 21/31* (2013.01); *H01L 21/823425* (2013.01); *H01L 21/823493* (2013.01); *H01L 23/58* (2013.01); *H01L 27/0203* (2013.01); *H01L 27/088* (2013.01)

(58) Field of Classification Search
USPC .......................................................... 257/288
See application file for complete search history.

(56) References Cited

U.S. PATENT DOCUMENTS

| 7,633,346 | B2 | 12/2009 | Oishi |
| 7,653,197 | B2 | 1/2010 | Van Dijk |
| 8,525,549 | B1 | 9/2013 | Feng et al. |
| 2007/0028871 | A1 | 2/2007 | Sugie et al. |
| 2007/0090312 | A1 | 4/2007 | Stallinga et al. |
| 2008/0044027 | A1 | 2/2008 | Van Dijk |
| 2008/0231418 | A1 | 9/2008 | Ophey et al. |
| 2008/0279373 | A1 | 11/2008 | Erhart et al. |
| 2009/0083833 | A1 | 3/2009 | Ziola et al. |

(Continued)

FOREIGN PATENT DOCUMENTS

| JP | 2000307392 A | 11/2000 |
| KR | 20100021446 A | 2/2010 |

OTHER PUBLICATIONS

B. Gassend et al., "Controlled Physical Random Functions," Proceedings of the 18th Annual Computer Security Applications Conference (ACSAC '02), Copyright 2002 IEEE, pp. 1-12.

(Continued)

*Primary Examiner* — Asok K Sarkar
(74) *Attorney, Agent, or Firm* — Cantor Colburn LLP (57) ABSTRACT

A Physical Unclonable Function (PUF) semiconductor device includes a semiconductor substrate, and a well formed in the semiconductor substrate. The well includes a first region having a first concentration of ions, and at least one second region having a second concentration that is less than the first concentration. First and second FETs are formed on the well. The first and second FETs have a voltage threshold mismatch with respect to one another based on the first region and the at least one second region.

20 Claims, 8 Drawing Sheets

(56) References Cited

U.S. PATENT DOCUMENTS

| | | | |
|---|---|---|---|
| 2009/0144534 A1* | 6/2009 | Calhoon et al. | 713/2 |
| 2009/0153841 A1 | 6/2009 | Ophey et al. | |
| 2010/0122353 A1 | 5/2010 | Koushanfar et al. | |
| 2010/0127822 A1 | 5/2010 | Devadas | |
| 2010/0146261 A1 | 6/2010 | Talstra et al. | |
| 2010/0293384 A1 | 11/2010 | Potkonjak | |
| 2010/0293612 A1 | 11/2010 | Potkonjak | |
| 2010/0322418 A1 | 12/2010 | Potkonjak | |
| 2011/0002461 A1 | 1/2011 | Erhart et al. | |
| 2011/0163088 A1 | 7/2011 | Besling et al. | |
| 2011/0234241 A1 | 9/2011 | Lewis et al. | |
| 2011/0254141 A1 | 10/2011 | Roest et al. | |
| 2011/0317829 A1 | 12/2011 | Ficke et al. | |
| 2012/0030268 A1 | 2/2012 | Liu et al. | |
| 2012/0161850 A1 | 6/2012 | Rangarajan et al. | |
| 2013/0233608 A1 | 9/2013 | Feng et al. | |

OTHER PUBLICATIONS

D. Puntin et al., "CMOS Unclonable System for Secure Authentication Based on Device Variability," Copyright 2008 IEEE, pp. 130-133.

J. Guajardo et al., "Physical Unclonable Functions and Public-Key Crypto for FPGA IP Protection," Copyright 2007 IEEE, pp. 187-195.

J. Li et al., "At-Speed Delay Characterizations for IC Authentication and Trojan Horse Detection," 2008 IEEE International Workshop on Hardware-Oriented Security and Trust, Anaheim, CA, Jun. 9, 2008, pp. 1-7.

K. Lofstrom et al., "IC Identification Circuit Using Device Mismatch," 2000 IEEE International Solid-State Circuits Conference, Copyright 2000 IEEE, pp. 1-2.

International Search Report and Written Opinion of the International Searching Authority, corresponding PCT Application No. PCT/USA2012/070799, mailed Apr. 30, 2013, pp. 1-10.

S. Maeda et al., "An Artificial Fingerprint Device (AFD): A Study of Identification Number Applications Utilizing Characteristics Variation of Polycrystalline Silicon TFTs," IEEE Transactions on Electron Devices, vol. 50, No. 6, Jun. 2003, Copyright 2003 IEEE, pp. 1451-1458.

S. S. Kumar et al., "Extended Abstract: The Butterfly PUF Protecting IP on Every FPGA," 2008 IEEE International Workshop on Hardware-Oriented Security and Trust, Anaheim, CA, Jun. 9, 2008.

Y. Alkabani et al., "Trusted Integrated Circuits: A Nondestructive Hidden Characteristics Extraction Approach," IH 2008, LNCS 5284, pp. 102-117, 2008; Copyright Springer-Verlag Berlin Heidelberg 2008.

Y. Su et al., "A 1.6pJ/bit 96% Stable Chip-ID Generating Circuit Using Process Variations," 2007 IEEE International Solid-State Circuits Conference, Copyright 2007 IEEE, pp. 406-407, 611.

Kai D. Feng et al., "Embedded On-Chip Security", U.S. Appl. No. 14/032,218, filed Sep. 20, 2013.

Kai D. Feng et al., "On-chip Structure for Security Application", U.S. Appl. No. 14/096,345, filed Dec. 4, 2013.

\* cited by examiner

SEMICONDUCTOR DEVICE INCLUDING ENHANCED VARIABILITY

BACKGROUND

The present invention relates to semiconductor devices, and more specifically, to a semiconductor device including enhanced variability and physical unclonable functionality.

Device variability is typically caused by process variation(s), and it is much more substantial in smaller devices. Such variability is significant in proper circuit operation, and process improvements are made in order to tighten the device variability. Recently, device variability is being sought and applied to enforce security in information technology. As the security of internet-related networks, circuits, and applications becomes ever more stringent, it has become desirable to protect the information shared among semiconductor device communication.

One approach for preventing the unauthorized cloning of semiconductor devices is the use of Physical Unclonable Function (PUF) to encode a physical semiconductor device with a random set of numerical bits. A PUF generates a set of numerical bits, for example, 128 bits to form a matrix "A" A calculation of Y=A*X is performed during operation of the PUF, where "A" is a matrix having elements generated from the PUF, "X" is an input vector called a "challenge," and "Y" is the output vector called the "response." The matrix "A" and the input vector should only be known to the chip owner such that only the owner may know if the response is correct. The PUF is typically embodied in the physical semiconductor device, and is easy to evaluate but hard to predict. A semiconductor device including a PUF must be easy to make but practically impossible to duplicate, even given the manufacturing process that fabricates the device.

SUMMARY

According to an exemplary embodiment, a method of fabricating a Physical Unclonable Function (PUF) semiconductor device comprises forming a well in a semiconductor substrate, and directing a plurality of ions to the semiconductor substrate. The method further includes delivering at least one ion into the well to form at least one first region having a first concentrating of ions, and inhibiting at least one ion from reaching the well to form at least one second region having a second concentration of ions that is less than the first concentration.

According to another exemplary embodiment, a Physical Unclonable Function (PUF) semiconductor device includes a semiconductor substrate, and a well formed in the semiconductor substrate. The well includes at least one first region and at least one second region. First and second FETs are formed on the well. The first and second FETs have a voltage threshold mismatch with respect to one another based on the at least one first region and the at least one second region.

Additional features are realized through the techniques of the present invention. Other exemplary embodiments are described in detail herein. For a better understanding of the invention and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, are apparent from the following detailed description taken in conjunction with the accompanying drawings in which:

DETAILED DESCRIPTION

Figure 1A:
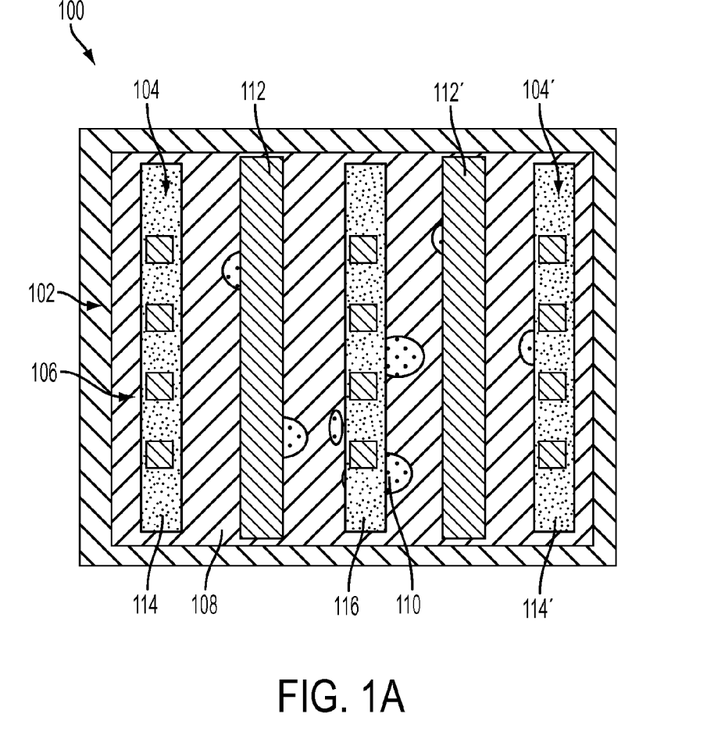
FIG. 1A is a top view of a PUF semiconductor device according to an exemplary embodiment.

Referring to FIG. 1A, a PUF semiconductor device 100 is illustrated according to an exemplary embodiment. The PUF semiconductor device 100 includes an active semiconductor substrate 102, a first semiconductor structure 104 and a second semiconductor structure 104'. The first and second semiconductor structures 104/104' will be described hereinafter as field effect transistors (FETs) for example. The first and second FETs 104/104' may be formed as a pair of n-type field effect transistors (NFETs) or as a pair of p-type field effect transistors (PFETs).

The active semiconductor substrate 102 includes a well 106 having at least one first region 108 and one or more second regions 110. According to at least one exemplary embodiment, the at least one first region 108 may encompass a plurality of second regions 110 formed therein. If the first and second FETs 104/104' are PFETs, for example, the well 106 may be doped with n-type ions to form an n-type well. The n-type ions may include, but are not limited to, phosphorus (P) and arsenic (As). If the first and second FETs 104/104' are NFETs, for example, the well 106 may be doped with p-type ions to form a p-type well. The p-type ions may include, for example, boron (B) and aluminum (Al). Going forward, the first region 108 will be described as an implanted region 108, and the second region 110 will be described as an intrinsic region 110. According to at least one exemplary embodiment, the at least one implanted region 108 contains a greater concentration of ions than the intrinsic regions 110. For example, the well 106 includes at least one implanted region 108 having a first concentration of ions and at least one intrinsic 110 region having a second concentration of the ions that is less than the first concentration of the implanted region 108.

Figure 1B:
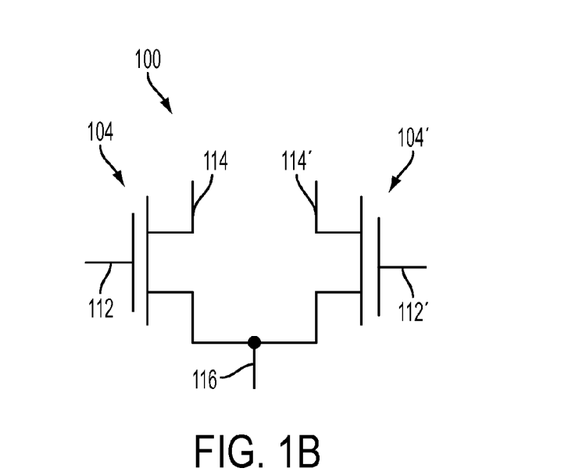
FIG. 1B is a schematic representation of the PUF semiconductor device illustrated in FIG. 1A.

The first and second FETs 104/104' are formed on the well 106. More specifically, the first FET 104 includes a first gate element 112 interposed between a first drain element 114 and a source element 116. The second FET 104' includes a second gate element 112' interposed between the source element 116 and a second drain element 114'. Thus, the first and the second FETs 104/104' each share the source element 116. The gate elements 112/112', the drain elements 114/114', and the source element 116, may be formed according to well-known semiconductor fabrication methods known to those ordinarily skilled in the art. A schematic diagram of the PUF semiconductor device 100 according to an exemplary embodiment is illustrated in FIG. 1B.

The FETs may be formed on top of a combination of implanted/intrinsic regions 108/110 based on the randomized formation of the implanted/intrinsic regions 108/110. This randomized formation of the implanted/intrinsic regions 108/110 is generated by performing a randomized ion implantation process and randomly inhibiting a portion of the ions from being implanted into the well 106 as described in greater detail below.

Each of the first and second FETs 104/104' has respective device parameters such as, for example, a respective voltage threshold ($V_t$). The respective $V_t$ differs from another due to the intrinsic regions 110 randomly formed in the well 106 thereby providing a randomized $V_t$ mismatch between the first FET 104 and the second FET 104'. That is, the first and second FETs will exhibit different device parameters due to the randomness of the intrinsic regions 110. Therefore, the $V_t$ of the first FET 104 and the second FET 104' may be compared to one another to determine a differential value (e.g., a $\Delta V_t$).

According to at least one embodiment, a detector such as differential amplifier or phase comparator may be used to determine one or more differential values (e.g., $\Delta V_t$) between the first FET 104 and the second FET 104'. Based on the differential value, one or more random numerical bits may be generated and used to generate a set of numerical bits corresponding to the PUF of semiconductor device 100 illustrated in FIG. 1B as understood by those ordinarily skilled in the art. A bit generator, for example, may receive the differential value and may generate the set of numerical bits used for the PUF. For example, the bit generator may be included in a chip package including the PUF semiconductor device 100. The bit generator receives the output of the detector such as differential amplifier or phase comparator and generates a set of numerical bits, for example, 128 numerical bits to form a matrix "A". A calculation (e.g., Y=A*X) is performed, where "A" is a matrix having elements generated from the PUF, "X" is an input vector called a "challenge," and "Y" is the output vector called the "response." The matrix "A" and the input vector should only be known to the chip owner such that only the owner may know if the response is correct.

According to a first embodiment, for example, electrical voltages having a common voltage value may be delivered to the first and second gate elements 112/112'. With identical load resistors with resistance R between the power supply and the corresponding drain elements, a first drain voltage across the load resistor R is obtained from the first drain current $i_{D1}$ ($V_{D1}=R \times i_{D1}$) at the first drain element 114 and a second drain voltage across the load resistor R is obtained from the second drain current $i_{D2}$ ($V_{D2}=R \times i_{D2}$) at the second drain element 114'. ($V_{D1}$) and ($V_{D2}$) may then be compared to one another to determine a drain voltage differential ($\Delta V_D$). A detector such as differential amplifier or phase comparator may compare the $\Delta V_D$ to a threshold voltage, and based on the comparison may output a high or low signal (i.e., a "1" or "0" bit). The randomness of the intrinsic regions, therefore, results in a binary output including a set of numerical bits that is unique to the PUF semiconductor device 100 and extremely difficult, if not practically impossible, to duplicate.

According to another embodiment, for example, a common voltage may be delivered to the first and second gate elements 112/112'. As a result, a first drain current ($i_{D1}$) flowing through the first drain element 114 may be measured, and a second drain current ($i_{D2}$) flowing through the second drain element 114' may be measured by a transimpedance amplifier, for example. The drain currents $i_{D1}$ and $i_{D2}$ may then be compared to one another to determine a current differential ($\Delta i_D$). Based on the sign of $\Delta i_D$, a binary output including a set of numerical bits is generated that is unique to the PUF semiconductor device 100 in a similar manner as discussed above.

Figure 2:
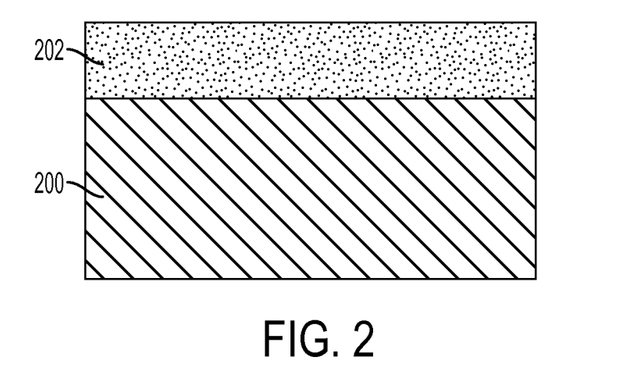
FIG. 2 is a cross-sectional view of a starting substrate having a photoresist layer formed on an upper surface thereof.

Referring to FIGS. 2-7, illustrate an exemplary process flow for fabricating a PUF semiconductor device similar to one described with reference to FIGS. 1A-1B. In this regard, FIG. 2 illustrates a cross-sectional view of a starting substrate 200 including a photoresist block layer 202 formed on an upper surface thereof. The starting substrate 200 may be formed from an active semiconductor material including, for example, silicon (Si). The photoresist block layer 202 may be formed from various polymer photoresist materials and may be applied using a spin-coating process as understood by those ordinarily skilled in the art.

Figure 3:
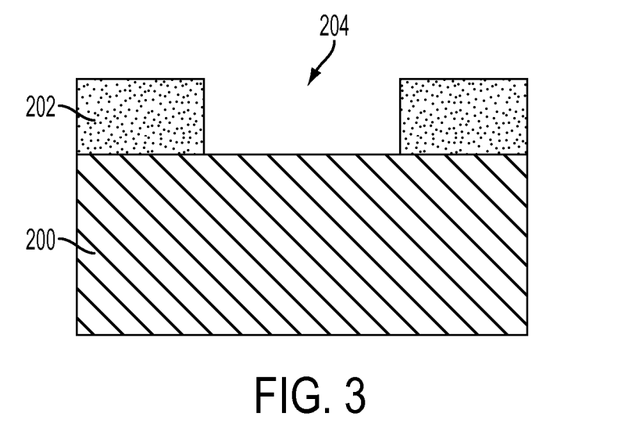
FIG. 3 illustrates the starting substrate of FIG. 2 following patterning of the photoresist layer to form a void that exposes a portion of the substrate.

Turning to FIG. 3, the photoresist block layer may be patterned to form a void 204 that exposes a portion of the underlying substrate 200. Various photoresist etching process may be used as understood by those ordinarily skilled in the art.

Figure 4:
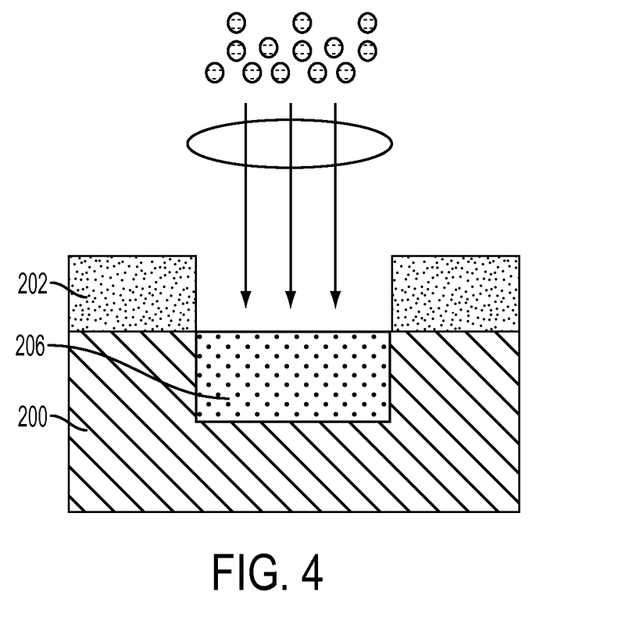
FIG. 4 illustrates the substrate of FIG. 3 undergoing a well implantation process that forms a well in the exposed portion of the substrate.

Referring to FIG. 4, a well implantation process is performed to form a well 206 in the exposed portion of the substrate 200. The well implantation process includes implanting ions into the substrate to form the well 206. The ions may be implanted at a depth ranging from approximately 10 nm (nanometers) 20 nm, for example. According to an exemplary embodiment, the ions may be n-type ions such that an n-type well 206 is formed. The n-type ions may include, for example, phosphorus (P) and arsenic (As). Thus, a pair of PFETs may be formed on the well 206. According to another embodiment, the ions may be p-type ions such that a p-type well 206 is formed. The p-type ions may include, for example, boron (B) and aluminum (Al). Thus, a pair of NFETs may be formed on the well 206.

Figure 5:
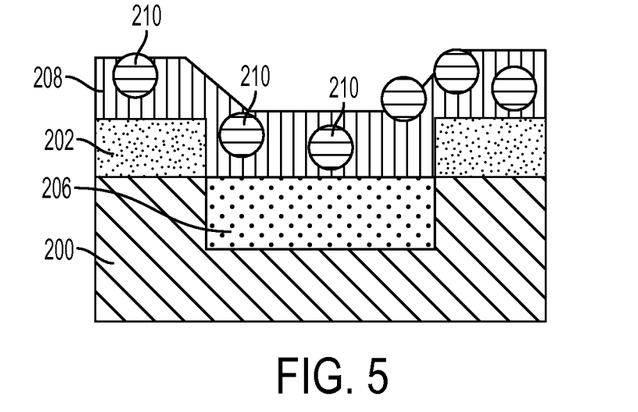
FIG. 5 illustrates the substrate of FIG. 4 following deposition of a particle photoresist layer on an upper surface of the photoresist layer and in the void to cover the well.

Turning now to FIG. 5, a particle photoresist layer 208 is deposited on an upper surface of the photoresist layer 202 and in the void 204 to cover the well 206. The particle photoresist layer 208 may be formed as polymer photoresist material containing a random disbursement of barrier particles 210 configured to prevent ions from passing therethrough. The barrier particles 210 may include, but are not limited to, Si particles. The particle photoresist 208 may be applied using, for example, a spin-coating process understood by those ordinarily skilled in the art.

Figure 6:
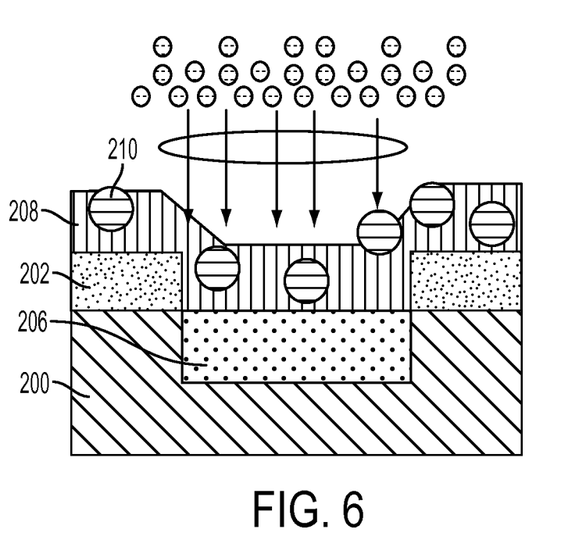
FIG. 6 illustrates the substrate of FIG. 5 undergoing an ion implantation process.

Referring now to FIG. 6, an ion implantation process is applied to the particle photoresist layer 208. According to at least one exemplary embodiment, the ions may be randomly dispersed toward the photoresist layer 208. The ions delivered in the ion implantation process may be the same type of ions delivered in the well implantation process described with reference to FIG. 4 above. For example, the ions delivered to the particle photoresist layer 208 formed on the well 206 may be n-type ions or p-type ions. The ions may be implanted with different energies, doses and angle due to the differences of technologies and devices. For example, it could be with an energy level of approximately 15 kiloelectron volts (KeV), at approximately $1E12$ $cm^{-3}$ per dose and an input angle of 7 degrees. According to at least one embodiment, the ions may be delivered at a higher energy dose than the ions delivered during the well implantation process described with respect to FIG. 4. For example, the barrier particles 210, however, prevent some of the ions from reaching portions of the well 206 located therebeneath.

Figure 7:
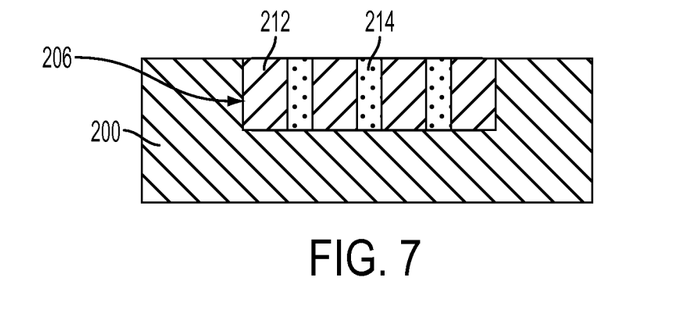
FIG. 7 illustrates the substrate of FIG. 6 illustrates the substrate of FIG. 6 including implanted regions and intrinsic regions formed randomly in the well following removal of the particle photoresist layer and the photoresist layer.

Turning now to FIG. 7, the substrate 200 is illustrated following the ion implantation process, and removal of the particle photoresist layer 208 and the photoresist layer 202. The particle photoresist layer 208 and the photoresist layer 202 may be removed using, for example, a wet etching process. The ion implantation process forms implanted regions 212 and intrinsic regions 214 in the well 206. As discussed above, barrier particles 210 prevent some of the ions delivered during the ion plantation process from reaching the well 206, thereby forming the intrinsic regions 214. Since the barrier particles 210 are randomly disbursed in the particle photoresist layer 208 the intrinsic regions 214 are randomly formed in the well 206.

Although one exemplary embodiment illustrated in FIG. 7 provides the implanted regions 212 and the intrinsic regions 214 in the well 206, it is appreciated that the implanted regions 212 and the intrinsic regions 214 may be formed in one or more other levels, portions, or regions of the substrate 200. For example, at least one exemplary embodiment comprises a semiconductor substrate 200 has at least one active implantation portion formed therein. The at least one active implantation portion may include at least one implanted region 212 and at least one intrinsic region 214. A well 206 may be formed in the active implantation portion, as understood by those ordinarily skilled in the art. First and second FETs may be formed on the active implantation portion of the substrate 200. The first and second FETs have a voltage threshold mismatch with respect to one another based on the at least one implanted region 212 and the at least one intrinsic region 214.

Figure 8:
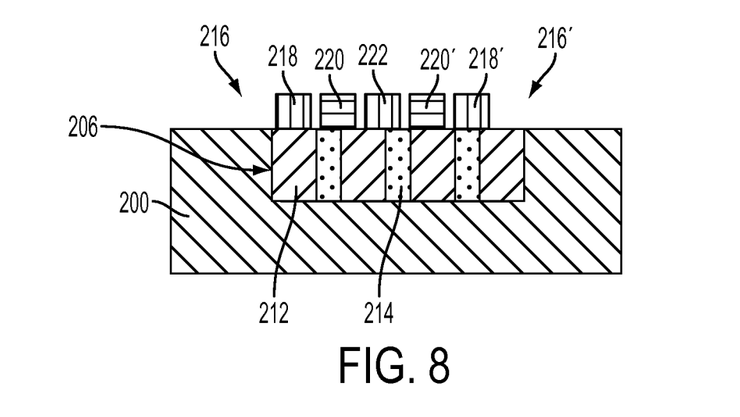
FIG. 8 illustrates the substrate of FIG. 7 following formation of first and second FETs formed on the well to form a PUF semiconductor device according to an exemplary embodiment.

Referring to FIG. 8, the substrate 200 is illustrated including first and second FETs 216/216' formed on the well 206. The FETs 216/216' may be formed as a pair of PFETs or a pair of NFETs. The first FET 216 includes a first drain element 218, a first gate element 220 and a source element 222. The second FET 216' includes the source element 222, a second gate element 220' and a second drain element 218'. Thus, the first and second FETs 216/216' share the source element 222. Various methods may be used to form the FETs 216/216' on the well 206 as understood by those ordinarily skilled in the art. It is appreciated by those ordinarily skilled in the art that one or more additional fabrication processes may be included in the above-mentioned process flow. For example, a device isolation process, a gate deposit process, etc., may be performed following the ion implantation process, and removal of the particle photoresist layer 208 and the photoresist layer 202 illustrated in FIG. 7.

As further illustrated in FIG. 8, the first and second FETs 216/216' are formed on the well 206, which includes the randomly arranged implanted regions 212 and intrinsic regions 214. According to at least one exemplary embodiment, the device threshold voltage ($V_t$) may be based on the overall local implantation regions under the gate element 220/220'. In this regard, the threshold voltage ($V_t$) depends on the location, size of the extra particle blocked implantation region 108 and/or or intrinsic 110. The main device threshold voltage may be based on the main well implantation 106 illustrated in FIG. 4. According to at least one embodiment illustrate in FIG. 1A, the intrinsic regions 110 are relatively small compared with device gate elements 112/112'. In this regard, one or more "intrinsic" regions 110 will generate additional threshold voltage ($V_t$) variations in the PUF device.

According to at least one exemplary embodiment, the intrinsic regions 110 may be formed beneath at least a portion of the source element 222/222', drain element 218/218' and/or gate element 220/220'. When the intrinsic regions are formed beneath a portion of the gate element 220/220', the device threshold voltage may be altered. In addition, if the intrinsic regions are formed beneath a portion of drain element 218/218' and/or source element 222/222', for example, the intrinsic regions may change the parasitic resistance which also generates randomized variation of the voltage threshold the PUF device. According to at least one embodiment, the effect of "intrinsic" region in source 222/222' and drain 218/218' may be relatively small with respect to the gate element 220/220' because the source and drain resistance are attributed to surface silicide, for example. As a result, the first and second FETs 216/216' are fabricated with randomized device parameters such as, for example, a randomized voltage threshold ($V_t$). Further, randomized intrinsic regions causes the device parameters (e.g., $V_t$) of the first and second FETs 216/216' to be mismatched with respect to one another. The device parameter mismatch created by the randomized intrinsic regions 214 allows for fabrication of a unique PUF semiconductor device that is extremely difficult, if not practically impossible, to duplicate as discussed above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram operations described therein without departing from the spirit of the invention. For instance, the operations may be performed in a differing order or operations may be added, deleted or modified. All of these variations are considered a part of the claimed invention.

While various exemplary embodiments have been described, it will be understood that those skilled in the art, both now and in the future, may make various modifications which fall within the scope of the following claims. These claims should be construed to maintain the proper protection for the invention first described.

What is claimed is:

1. A method of fabricating a Physical Unclonable Function (PUF) semiconductor device, the method comprising:
    forming a well in a semiconductor substrate; and
    delivering a first portion of random implantation ions into a first portion of the well to form a first region while inhibiting a second portion of the random implantation ions from reaching a second portion of the well to form at least one second region such that the first region has a greater concentration of the random implantation ions than the second region.

2. The method of claim 1, further comprising forming first and second FETs on the well such that a combination of the first region and the at least one second region alters a first voltage threshold of the first FET and a second voltage threshold of the second FET to be different.

3. The method of claim 2, further comprising, before the step of delivering the first portion and inhibiting the second portion of random implantation ions, depositing a particle photoresist layer to cover the well, the particle photoresist layer including a random arrangement of barrier particles that, when being in the path of the random implantation ions, inhibits the random implantation ions from reaching the well.

4. The method of claim 3, wherein the particle photoresist layer comprises a polymer photoresist material containing the barrier particles.

5. The method of claim 4 wherein the forming the well comprises:
    before delivering the first portion of random implantation ions and before inhibiting the second portion of random implantation ions, forming a well-implant photoresist on an upper surface of the semiconductor substrate;
    patterning the photoresist layer to create a void that exposes a portion of the semiconductor substrate; and
    performing well implantation to form the well in the exposed portion of the semiconductor substrate.

6. The method of 5, further comprising:
    removing the particle photoresist layer and the photoresist layer to expose the first regions and the second regions.

7. The method of claim 6, wherein the forming the first and second FETs further comprises:
    forming a first source/drain element and a first gate element corresponding to the first FET;
    forming a second source/drain element and a second gate element corresponding to the second FET; and
    forming a common source/drain element on the well, the common source/drain element shared by each of the first and second FETs.

8. The method of claim 7, wherein the barrier particles are particles of silicon.

9. The method of claim 8, further comprising generating a plurality of random numerical bits indicating a random voltage threshold mismatch between the first and second FETs, the numerical bits based on a difference between a first drain voltage or a drain current and a second drain voltage or a drain current when both FETs have an identical gate voltage.

10. A Physical Unclonable Function (PUF) semiconductor device comprising:
    a semiconductor substrate;
    a well formed in the semiconductor substrate, the well including a first region having a first concentration of random implantation ions and at least one second region having a second concentration of the random implantation ions that is less than the first concentration; and
    first and second FETs formed on the well, the first and second FETs having a voltage threshold mismatch with respect to one another based on the first region and the at least one second region.

11. The PUF semiconductor device of claim 10, wherein the first region encompasses a plurality of second regions formed therein.

12. The PUF semiconductor device of claim 11, wherein the plurality of second regions are smaller than the first region and are formed at random locations in the first region.

13. The PUF semiconductor device of claim 12, wherein the first region contains a greater concentration of the random implantation ions than the plurality of second regions.

14. The PUF semiconductor device of claim 13 wherein the substrate is formed from silicon (Si) and the random implantation ions are one of n-type ions or p-type ions.

15. The PUF semiconductor device of claim 14, wherein a first voltage threshold of the first FET is based on a first portion of the well including a first combination of first and second regions, and wherein a second voltage threshold of the second FET is based on a second portion of the well including a second combination of first and second regions.

16. The PUF semiconductor device of claim 15, further comprising:
    a first source/drain element and a first gate element corresponding to the first FET;
    a second source/drain element and a second gate element corresponding to the second FET; and
    a common source element on the well, the common source element shared by each of the first and second FETs.

17. The PUF semiconductor device of claim 16, wherein a drain voltage differential between the first and second FETs is determined in response to delivering a common voltage to the first and second gate elements.

18. The PUF semiconductor device of claim 17, a plurality of random numerical bits indicating a random voltage threshold mismatch between the first and second FETs is based on the drain voltage differential.

19. A Physical Unclonable Function (PUF) semiconductor device comprising:
    a semiconductor substrate having at least one active implantation portion formed therein, the at least one active implantation portion including a first region having a first concentration of random implantation ions and at least one second region having a second concentration of random implantation ions being less than the first concentration;
    a well formed in the active implantation portion; and
    first and second FETs formed on the active implantation portion, the first and second FETs having a voltage threshold mismatch with respect to one another based on the first region and the at least one second region.

20. The PUF semiconductor device of claim 19, wherein the first region encompasses a plurality of second regions formed at random locations therein.

* * * * *

UNITED STATES PATENT AND TRADEMARK OFFICE
CERTIFICATE OF CORRECTION

PATENT NO.       : 9,166,588 B2
APPLICATION NO.  : 14/158917
DATED            : October 20, 2015
INVENTOR(S)      : Kai D. Feng et al.

It is certified that error appears in the above-identified patent and that said Letters Patent is hereby corrected as shown below:

ON THE TITLE PAGE

ITEM 73

The Name of the Assignee on the Letters Patent currently lists:

GLOBALFOUNDIRES INC.

The name of the Assignee should list:

-- GLOBALFOUNDRIES INC. --

Signed and Sealed this
Twenty-ninth Day of March, 2016

Michelle K. Lee
*Director of the United States Patent and Trademark Office*